US007617081B2

(12) United States Patent  
Von Winckel et al.

(10) Patent No.: US 7,617,081 B2
(45) Date of Patent: Nov. 10, 2009

(54) SPECTRAL ELEMENT EIGENSOLVER FOR INHOMOGENEOUS MEDIA

(75) Inventors: Gregory Von Winckel, Albuquerque, NM (US); Evangelos A. Coutsias, Albuquerque, NM (US); Sanjay Krishna, Albuquerque, NM (US)

(73) Assignee: STC.UNM, Albuqerque, NM (US)

( * ) Notice: Subject to any disclaimer, the term of this patent is extended or adjusted under 35 U.S.C. 154(b) by 708 days.

(21) Appl. No.: 11/157,474

(22) Filed: Jun. 21, 2005

(65) Prior Publication Data

US 2006/0009956 A1    Jan. 12, 2006

Related U.S. Application Data

(60) Provisional application No. 60/581,432, filed on Jun. 21, 2004.

(51) Int. Cl.
G06F 17/10    (2006.01)
(52) U.S. Cl. .................................. 703/2; 703/1; 703/6
(58) Field of Classification Search .................... 703/1, 703/2, 6; 702/27
See application file for complete search history.

(56) References Cited

U.S. PATENT DOCUMENTS 7,398,162 B2 *    7/2008    Downs et al. ................. 702/27

OTHER PUBLICATIONS

Alonso-Mallo et al., "Weak ill-posedness of spatial discretizations of absorbing boundary conditions for Schrodinger-type equations", SIAM Journal on Numerical Analysis, vol. 40, No. 1, 2003, pp. 134-158.*

Anwar, A, et al., "Density of states for double-barrier quantum-well structures under the influence of external fields and phase-breaking scattering", *Physical Review B (Condensed Matter)*, 50(15), (Oct. 15, 1994), 10864-7.

Braun, M, et al., "An efficient Chebyshev-Lanczos method for obtaining eigensolutions of the Schrodinger equation on a grid", *Journal of Computational Physics*, 126(2), (Jul. 1996), 315-27.

Cizek, M., et al., "On shooting methods for calculation of potential resonances", *Journal of Physics A (Mathematical and General)*, 29(19), (Oct. 7, 1996), 6325-42.

Coutsais, E. A, et al., "Integration preconditioners for differential operators in spectral methods", *Proc. Of International Conference on Spectral and High Order Methods, ICOSAHOM'95*, Houston, USA, (1995), 21-38.

Coutsias, E. A, et al., "An efficient spectral method for ordinary differential equations with rational function coefficients", *Mathematics of Computation*, 65(214), (Apr. 1996), 611-35.

De La Madrid, R, et al., "A pedestrian introduction to Gamow vectors", *Journal of Physics*, 70(6), (Jun. 2002), 626-38.

Gottlieb, D, et al., "On the Gibbs phenomenon and its resolution", *SIAM Review*, 39(4), (Dec. 1997), 644-68.

(Continued)

*Primary Examiner*—Kamini S. Shah
*Assistant Examiner*—Herng-Der Day
(74) *Attorney, Agent, or Firm*—Schwegman, Lundberg & Woessner, P.A.

(57) ABSTRACT

Methods are provided to generate eigenvalues and eigenfunctions for structures that include inhomogeneous media. In embodiments, eigenvalues and eigenfunctions generated as solutions to differential equations provide parameters for analyzing and constructing structures modeled by the differential equations.

27 Claims, 7 Drawing Sheets

OTHER PUBLICATIONS

Guo, B-Y., et al., "Chebyshev rational spectral and pseudospectral methods on a semi-infinite interval", *International Journal for Numerical Methods in Engineering*, 53(1), (Jan. 10, 2002), 65-84.

Hagstrom, T, "New results on absorbing layers and radiation boundary conditions", *Topics in Computational Wave Propagation*, M. Ainsworth, P. Davies, D. Duncan, P. Martin, and B. Rynne, eds., Springer-Verlag, (2003), 1-42.

Hernandez, E, et al., "Jordan blocks and Gamow-Jordan eigenfunctions associated with a degeneracy of unbound states", *Physical Review A—Atomic, Molecular, and Optical Physics*, 67(2), (Feb. 2003), 022721/1-022721/15.

Leonhardt, U, et al., "State reconstruction in one-dimensional quantum mechanics: the continuous spectrum", *Physical Review A. Atomic, Molecular, and Optical Physics*, 56(4), (Oct. 1997), 2549-2556.

Levy, M. F, "Perfectly matched layer truncation for parabolic wave equation models", *Proceedings of the Royal Society of London, Series A (Mathematical, Physical and Engineering Sciences)*, 457(2015), (Nov. 8, 2001), 2609-24.

McIntosh, H. V, "Quantization as an Eigenvalue Problem", *Theory and its Applications*, (EM Loebl, ed), Academic Press, New York, (1975), 333-368.

Midy, P, et al., "Complex eigenenergy spectrum of the Schrodinger equation using Lanczos' tau method", *Journal of Physics B (Atomic, Molecular and Optical Physics)*, 26(5), (Mar. 14, 1993), 835-53.

Peres, A, "Transfer matrices for one-dimensional potentials", *Journal of Mathematical Physics*, 24(5), (May 1983), 1110-19.

Rheinhard, W. P, "Complex coordinates in the theory of atomic and molecular structure and dynamics", *Annual Review of Physical Chemistry*, 33, (1983), 223-255.

Shen, J., "Stable and efficient spectral methods in unbounded domains using Laguerre functions", *SIAM Journal on Numerical Analysis*, 38(4), (2000), 1113-1133.

Shibata, T, "Absorbing boundary conditions for the finite-difference time-domain calculation of the one dimensional Schrodinger equation", *Physical Review B*, 43(8), (1991), 6760-6763.

Siyyam, H. I, "Laguerre Tau methods for solving higher-order ordinary differential equations", *Journal of Computational Analysis and Applications*, 3(2), (Apr. 2001), 173-182.

Tisseur, F., et al., "The quadratic eigenvalue problem", *SIAM Review*, 43(2), (Jun. 2001), 235-286.

\* cited by examiner

SPECTRAL ELEMENT EIGENSOLVER FOR INHOMOGENEOUS MEDIA

RELATED APPLICATIONS

This application claims priority under 35 U.S.C. 119(e) from U.S. Provisional Application Ser. No. 60/581,432 filed 21 Jun. 2004, which application is incorporated herein by reference.

BACKGROUND

Numerous physical structures of commercial interest, including optical fibers, semiconductor lasers, quantum well infrared photo-detectors and the like have physical behavior governed by the solution of a wave equation in a medium consisting of multiple materials. Solution to this equation may be essential in the design process of such structures.

Traditionally, mathematical techniques, such as finite difference methods or shooting methods such as the transfer matrix and transmission line analogy, are used to compute eigenvalues and eigenfunctions in such structures and systems. While such techniques provide accurate solutions, these techniques are usually mathematically inefficient, requiring large matrices and significant computation time. Furthermore, it is difficult to apply the above-mentioned techniques to open system wave problems, without additional steps of domain truncation and imposing transparent boundary conditions.

LITERATURE

[1] C. Canuto, M. Y. Hussaini, A. Quarteroni, and T. A. Zang, *Spectral Methods in Fluid Dynamics*, Springer-Verlag, New York (1987)

[2] T. Shibeta, Phys. Rev B 43 (8) 6760-6763 (1991)

[3] A. Peres, J. Math. Phys 24 1110-1119 (1983)

[4] M. Clzek, J. Horáček, J. Phys. A, 29 6325-6342 (1996)

[5] A. F. M. Anwar and M. M. Janah, Phys. Rev. B, 50 (15) 10864-10867 (1994)

[6] P. Midy, O. Atabek, and G. Oliver J. Phys. B: At. Mol. Opt. Phys 26 835-853 (1993)

[7] M. Braun, S. A. Sofianos, D. G. Papageorgiou, and I. E. Lagaris J. Comp. Phys. 126 315-327 (1996)

[8] C. Lanczos, *Applied Analysis*, Prentice-Hall, Englewood Cliffs, N.J., (1956).

[9] G. H. Golub, C. F. van Loan, *Matrix Computations* Johns Hopkins University Press (1996).

[10] D. Gottlieb and S. Orszag, *Numerical Analysis of Spectral Methods*, SIAM, Philadelphia, Pa. (1977).

[11] G. Szegö, *Orthogonal Polynomials*, American Mathematical Society Colloquium Publications, Vol. 23, (2003)

[12] D. Gottlieb and C. W. Shu, SIAM Rev. 39 644-668 (1997)

[13] E. A. Coutsias, T. Hagstrom, D. Torres, Math. Comp., 65, (214) 611-635

[14] E. A. Coutsais, T. Hagstrom, J. S. Hesthaven, and D. Torres, Proc. of International Conference on Spectral and High Order Methods, ICOSAHOM '95, Houston, USA, 1995, pp. 21-38

[15] R. B. Lehoucq, D. C. Sorensen, and C. Yang, *ARPACK Users' Guide: Solution of Large-Scale Eigenvalue Problems with Implicitly Restarted Arnoldi Methods*, SIAM (1998)

[16] I. Alonso-Mallo and N. Regurra, SIAM J. Numer. Anal. 40 (1) 134-158 (2002)

[17] F. Tisseur and K. Meerbergen, SIAM Rev 43 (2) pp. 235-286 (2001)

[18] J. Shen, SIAM J. Numer. Anal. 38 (4) 1113-1133 (2000)

[19] H. I. Siyyam, J. Comp. Anal. App., 3 (2) 173-182 (2001)

[20] B. Guo, J. Shen, Z. Wang, Int. J. Num. Meth. Eng. 53 65-84 (2002)

[21] H. V. McIntosh, "Quantization as an Eigenvalue Problem" in *Group Theory and its Applications*, (E. M. Loebl, ed.), Academic Press, New York, (1975)

[22] R. de la Madrid and M. Gadella, Am. J. Phys. 70 626-638 (2002)

[23] E. Hernandez, A. Jáuregul, and A. Mondragón, Phys. Rev. A 67 022721 (2003)

[24] U. Leonhardt and S. Schneider, Phys. Rev. A 56 (4) 2549-56 (1997)

[25] E. N. Economou, *Green's Functions in Quantum Physics* Springer-Verlag (1983)

[26] G. Barton, *Elements of Green's Functions and Propagation: Potentials, Diffusion, and Waves* Oxford Univ. Press (1989)

[27] W. P. Rheinhard, Ann. Rev. Phys. Chem., 33 223-255 (1982)

[28] M.F. Levy, Proc Roy. Soc. Lond. A, 457 2609-2624 (2001)

[29] Hagstrom, T., "New results on absorbing layers and radiation boundary conditions", in *Topics in Computational Wave Propagation*, M. Ainsworth, P. Davies, D. Duncan, P. Martin, and B. Rynne, eds., Springer-Verlag (2003), 1-42.

All publications listed above are incorporated by reference herein, as though individually incorporated by reference.

DETAILED DESCRIPTION

Figure 1:
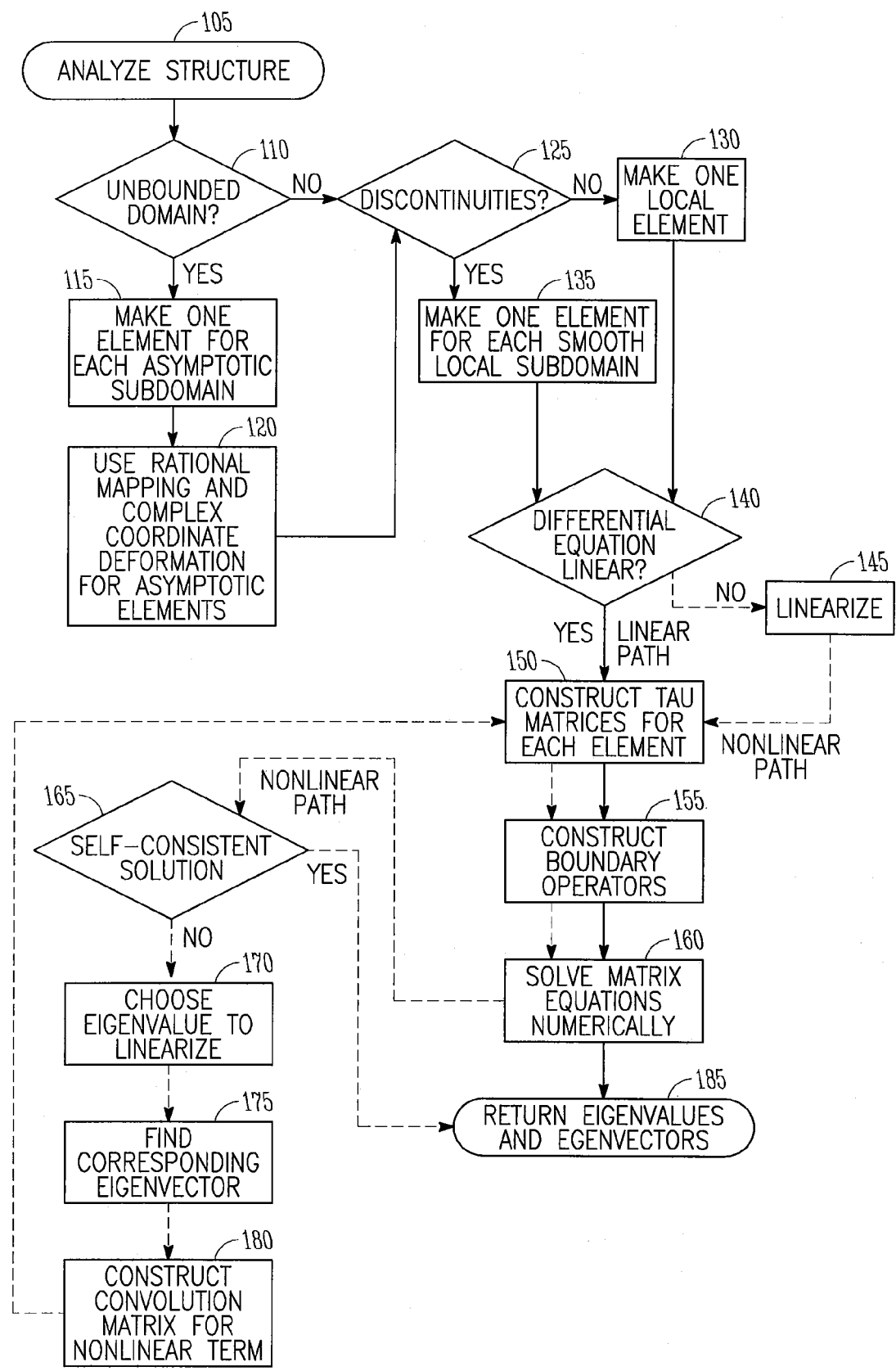
FIG. 1 shows a flow diagram of an embodiment of a spectral element solver for inhomogeneous media.

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense.

In an embodiment, a spectral element method provides a computationally efficient and accurate solver for problems represented by equations. The equations may be differential equations such as, but not limited to, the wave equation. In an embodiment, a method provides an approach to solving problems associated with arbitrary inhomogeneous media. In an embodiment, a method provides a fast and accurate algorithm for computing eigenvalues and eigenfunctions of wave equations in arbitrary inhomogeneous media. Various embodiments may provide an efficient solver may significantly reduce time and cost for designing new structures for wave mechanics applications. Such a solver may be applied to optical fibers, semiconductor lasers, quantum well infrared photo-detectors, and devices using semiconductor heterostructures, but is not limited to design and constructing these types of apparatus.

In general, when two different materials are adjacent, functions describing properties of the material will have discontinuities at the interface between the two materials. In an embodiment, a method includes an approach to decompose the problem into elements, where each region of different material is modeled by an element. An element may be a domain or sub-domain. In one dimension, an element may be an interval (finite, semi-infinite, or infinite in length). In two dimensions, an element may be an area. Typically, elements in 2D are quadrilaterals or triangles, but they can be any shape such as polygons, discs, or novel shapes. In three dimensions, an element may be a volume. Typically, elements in 3D may be cubes or tetrahedra, but may be more general shapes. Within the element the solution of the wave equation is expanded as a series of orthogonal functions.

Using spectral methods, once the solution is written as a series expansion, the problem is discretized and instead of differential equations, a matrix equation remains. A spectral element corresponds to an element and a discretization of a differential equation over the domain by writing the solution as a finite series of orthogonal functions such as certain polynomials. Once the solution is written in this form, the differential operator becomes a matrix which operates on the expansion coefficients of the solution. This may be referred to as the modal or spectral space representation. Through a similarity transformation, it is also possible to describe the operation on a set of points in the domain. This may be referred to as a nodal or point space representation. In an embodiment, the Lanczos' tau method may be used to compute the solution within each element and impose matching conditions to force the solution within each element and impose matching conditions to force the solution to be continuous and differentiable across domain interfaces. In open wave problems, the domain is unbounded, and the traditional approach is to truncate the domain and impose transparent boundary conditions. In an embodiment, mapping techniques are used to avoid the problem associated many wave equations that it is not possible to truncate the domain and impose transparent boundary exactly. Intervals of semi-infinite length can be mapped to finite length intervals using a rational map. In an embodiment, mapped asymptotic elements for the exterior of the domains may be used, which provide significantly faster convergence than for more traditional domain truncation methods. Frequently, depending on the geometry of the medium, there may be resonant solutions as well. Resonant solutions are notoriously difficult to compute as they are ill-behaved at large distances. In embodiment, the coordinate system in the complex plane may be deformed to the contour along which the resonant solutions are well behaved and a convergent series exists, which allows computation of resonant solutions with ease. In an embodiment, a solver works equally well for nonlinear wave equations and for the Hartree-Fock approximation of many-particle problems in quantum mechanics.

In an embodiment, Chebyshev polynomials of the first kind may be chosen as basis functions to allow rapid convergence to solutions. However, as can be understood by those skilled in the art, other basis functions that may be used include, but are not limited to, Chebyshev polynomials and Legendre polynomials. In an embodiment, a solver is applied to provide a solution to the time-independent Schrödinger equation in one dimension. Various embodiments may be applied to solve other differential equations including, but not limited to, Schrödinger equation with illustrative application to a linear and a nonlinear case, Klein-Gordon with illustrative application to relativistic waves, Dirac equation with illustrative application to relativistic waves with spin, Poisson equation with illustrative application to charge distribution, Helmholtz equation with illustrative application to waveguides and acoustics, Maxwell equation with illustrative application to electromagnetics, and the Kortwe de-Vries equation with illustrative application to solitons. Embodiments are not limited to one-dimensional problems. Application to a one-dimensional problem herein is for illustrative purposes and is not intended to restrict or limit the various embodiments.

FIG. 1 shows a flow diagram of an embodiment of a method for applying a spectral element solver for inhomogeneous media. At 105, a structure is analyzed with respect to its application. At 110, a determination is made as to whether a domain for the problem is unbounded. If the domain is bounded, at 125, a determination of whether there are discontinuities is made. If the domain is unbounded, at 115, one element is made for each asymptotic sub-domain. At 120, rational mapping and complex coordinate deformation for the asymptotic elements is applied. After using rational mapping and complex coordinate deformation for asymptotic elements, at 125, a determination of whether there are discontinuities is made.

If there are no discontinuities, at 130, one local element is made. In an embodiment, a situation having no discontinuities may correlate to a domain having one material. If there are discontinuities, one element for each smooth local sub-domain is made, at 135. At 140, a determination is made as to whether the differential equation is linear. If the differential equation is nonlinear, it is linearized, at 145. If the differential equation is linear, tau matrices are constructed for each element, at 150. Tau matrices and their construction are known to those skilled in the art. At 155, boundary operators are constructed. At 160, matrix equations are numerically solved. If the differential equation is linear, at 185, eigenvalues and eigenvectors are provided to further analyze the structure of the application and/or proceed in the formation of the structure of the application.

If the differential equation is nonlinear, after numerically solving matrix equations at 160, a determination is made as to whether the solution is self-consistent, at 165. If the solution in the nonlinear path is self-consistent, eigenvalues and eigenvectors are provided, at 185, to further analyze the structure of the application and/or proceed in the formation of the structure of the application. If the solution in the nonlinear path is not self-consistent, an eigenvalue is chosen to linearize, at 170. At 175, an eigenvector corresponding to the chosen eigenvalue is determined. At 180, a convolution matrix for the nonlinear term is constructed and the procedure returns to 150 to construct tau matrices for each element. The procedure may continue from 150 along the nonlinear path until a self-consistent solution is determined at 165, in which case, eigenvalues and eigenvectors are provided, at 185, to further analyze the structure of the application and/or proceed in the formation of the structure of the application.

In an embodiment, spectral element modeling may be applied to semiconductor heterostructures. In an embodiment, a spectral method for computing the eigenvalues and eigenfunctions for a one-dimensional piecewise smooth potential, as is the case of epitaxially grown semiconductor heterostructures, is provided. Such a spectral method may be fast and efficient. Many physical devices such as quantum well infrared photo-detectors rely upon transitions between bound and quasi-bound or continuum states, consequently it is important to determine the resonant spectrum as well as the bound states. Two approaches to the unbound domain problem are introduced. A least-squares rational approximation for radiation conditions can give sizeable errors, which do not improve with truncation. Instead of trying to approximate the transparent boundary conditions, an embodiment uses mapping to compute the solution over all space to machine precision. Moreover, in an embodiment, resonant eigenvalues may be computed without shooting methods by deforming the coordinates in the complex plane to a contour along which the eigenfunctions decay exponentially. In an embodiment, a means of computing inner products and expectations of operators with quadrature accuracy in the spectral domain is provided.

Spectral methods have been most popular in the field of computational fluid dynamics, although, spectral methods are well suited to quantum mechanical problems. Even so, the literature for spectral methods in quantum mechanics is relatively limited. More commonly, finite difference schemes or shooting methods such as the transfer matrix and transmission line analogy have been employed in computing eigenvalues and eigenfunctions for quantum mechanical potentials. Spectral methods have been employed to compute eigenfunctions for atomic and oscillator potentials with great success. In an embodiment, a spectral-element approach is introduced and based on a Lanczos' tau method for solving the time-independent Schrödinger equation (TISE) with arbitrary piecewise smooth potentials in unbounded domains. Lanczos' tau method is known by those skilled in the art. In an embodiment, this approach allows for a numerically robust and fast computation of the eigenvalues and eigenvectors of the Hamiltonian operator for potentials with an arbitrary number of discontinuities, typified by epitaxially grown quantum semiconductor devices. The spectral method offers a substantial advantage over shooting methods in that it is possible to simultaneously compute as many eigenfunctions and eigenvalues as desired. While this is also true for finite difference schemes, for a given tolerable error, the spectral method requires matrices which are usually orders of magnitude smaller than the corresponding finite difference matrices. Since the energy band profile of an epitaxially grown structure is piecewise smooth, spectral-element methods guarantee exponential convergence of the solution, whereas finite-difference methods will converge only algebraically.

Spectral methods are divided into three general types: Galerkin, tau, and collocation schemes, which are also called pseudospectral methods. In the Galerkin method, the solution of a differential equation (DE) is expanded in terms of trial functions. The trial functions are constructed from a basis of orthogonal polynomials so that each trial function satisfies the boundary conditions (BCs) independently. In contrast, the tau method directly uses the basis functions as trial functions even though these do not individually satisfy the BCs. Instead so-called tau conditions are imposed, which require that the superposition of trial functions satisfy the BCs. Both tau and Galerkin methods operate in the spectral or modal space, meaning that the solution of the DE is represented by a vector containing the coefficients of expansion in terms of trial functions. Collocation schemes work directly in point or nodal space and are frequently favored for nonlinear problems as the iterative solution to the DE often requires less computational effort. DEs involving complicated BCs can render Galerkin methods less appealing as the construction of trial functions becomes more laborious and computationally expensive. In an embodiment, the tau method is used over collocation for two reasons. It gives slightly faster convergence, but more importantly the matrices can be converted to quasi-banded form allowing the use of sparse eigenvalue-solvers. In an embodiment, Chebyshev polynomials of the first kind maybe chosen as the trial functions because the Chebyshev-Gauss-Lobatto nodes have a closed-form expression and allow use of the Fast Fourier Transform (FFT) to transform between point space and modal space. Using Legendre or Gegenbauer polynomials as the trial functions may not produce any significant improvement over Chebyshev polynomials.

In an embodiment, a method includes a multi-domain approach combined with rational mapping that allows one to treat the asymptotic regions exactly as any other elements. By deforming the coordinates to a contour in the complex plane, a trajectory along which the resonant eigenfunctions decay may be determined along with having a convergent expansion which allows the efficient computation of the resonant spectrum.

The TISE in one dimension is $$\left\{-\frac{\hbar^2}{2}\frac{d}{dx}\frac{1}{m^*(x)}\frac{d}{dx} + V(x)\right\}\psi(x) = E\psi(x) \quad (1)$$

Assume that V'(x) has compact support such that the potential is asymptotically constant.

$$V(x) = \begin{cases} V_l & \text{if } x < x_l \\ V_r & \text{if } x > x_r \end{cases} \quad (2)$$

The potential V(x) may have discontinuities at $x_l$ and $x_r$ but is assumed smooth for $x_l < x < x_r$. Let $$p(x) = \frac{m_0}{m^*(x)}, \quad q(x) = \frac{2m_0}{\hbar^2}V(x), \quad \lambda = \frac{2m_0}{\hbar^2}E \quad (3)$$

which yields the Sturm-Liouville equation $$\left\{-\frac{d'}{dx}p(x)\frac{d}{dx} + q(x)\right\}\psi(x) = \lambda\psi(x). \quad (4)$$

A linear transformation maps from the internal $x \in [x_l, x_r]$ to the unit interval $\bar{x} \in [-1, 1]$. This transformation is $$\bar{x} = \frac{2x - x_l - x_r}{x_r - x_l}, \quad u(\bar{x}) = \psi(x) \quad (5)$$

The Schrödinger eigenproblem is then solved numerically using Lanczos' tau method, which is described in detail below. Let N be the order of truncation so that on the unit interval the Chebyshev-Gauss-Lobatto (CGL) nodes are $$\bar{x}_k = \cos \pi k/N, k \in \{0, 1, \ldots, N\} \qquad (6)$$

The known functions $p(\bar{x})$ and $q(\bar{x})$ are samples at the CGL nodes and are expanded in terms of Chebyshev polynomials of the first kind.

$$p_N(\bar{x}) = \sum_{j=0}^{N} \hat{p}_j T_j(\bar{x}). \qquad (7)$$

The Chebyshev polynomials satisfy the following recurrence relation and derivative identity $$T_0(x) = 1, \quad T_1(x) = x, \qquad (8)$$

$$T_{j+1}(x) = 2xT_j(x) - T_{j-1}(x),$$

$$2T_j(x) = \frac{1}{j+1}T_{j+1}^d(x) - \frac{1}{j-1}T_{j-1}^d(x).$$

The values that $p(\bar{x})$ takes at the CGL nodes are stored in a column vector $p_N$. The vectors of nodal values and expansion coefficients are related by the cosine transform matrix $$p_N = M\hat{p}, \quad M_{ij} = \cos\frac{\pi i j}{N}$$

The structure of the matrix M allows for transformation between the nodal space where the function is represented by the vector $p_N$ and the coefficient space where the function is represented by $\hat{p}$ using the FFT which scales as $O(N \log(N))$ instead of $O(N^2)$. The functions $p(x)$ and $q(x)$ have convolution matrix representations of the form $$P = \sum_{j=0}^{N} \hat{p}_j T_j, \qquad (10)$$

where the $T_j$ are computed from the Chebyshev recurrence relation applied to the X matrix (A2)

$$T_0 = I, T_1 = X,$$

$$T_{j+1} = 2XT_j - T_{j-1}, j=1,2, \qquad (11)$$

Here I is the identity. One now obtains the matrix form of the differential equation $$\{-\alpha^2 D[PD] + Q\}\hat{u} = \lambda \hat{u}. \qquad (12)$$

where the differentiation operator has been discretized as the D matrix (A1). The $\alpha$ term is a scaling factor which arises from the change of coordinates when the problem was mapped onto the unit interval ($\alpha = 2/L$). It is often desirable to convert to integration preconditioned form, which improves the convergence, but more importantly renders the generalized eigenproblem more sparse, which is of particular value when using a sparse eigenvalue solver such as ARPACK. Two important identities are $$DX - XD = I, B_{[1]}D = I_{[1]}, \qquad (13)$$

where $B_{[1]}$ is the integration matrix (A3). The notation $A_{[n]}$ is used for the matrix A with the first n rows set to zero. To convert to integrator form, the second derivative must be brought to the left of P, where to do so, the necessary identity is $$PD = DP - P', \qquad (14)$$

where the prime notation indicates $$P' = \sum_{j=0}^{N} \tilde{p}_j T_j, \hat{p}' = D^T \hat{p} \qquad (15)$$

The DE may be rewritten as the matrix equation $$\{-\alpha^2 D[DP - P'] + Q\}\hat{u} = \lambda \hat{u} \qquad (16)$$

The integration $B_{[1]}$ matrix is then applied twice and letting $$L = -\alpha^2 P + \alpha^2 BP' + B^2 Q \qquad (17)$$

the generalized eigenvalue problem (GEP)

$$L\hat{u} = \lambda B^2 \hat{u} \qquad (18)$$

is obtained. Now, the two tau conditions are imposed, since the DE is second order. This is accomplished by inserting Dirichlet operators for the endpoints into the first two rows of L. These operators are described below. The GEP may be solved numerically using the QZ algorithm. This may be easily accomplished in MATLAB® with the command eig (L, B2).

Figure 2:
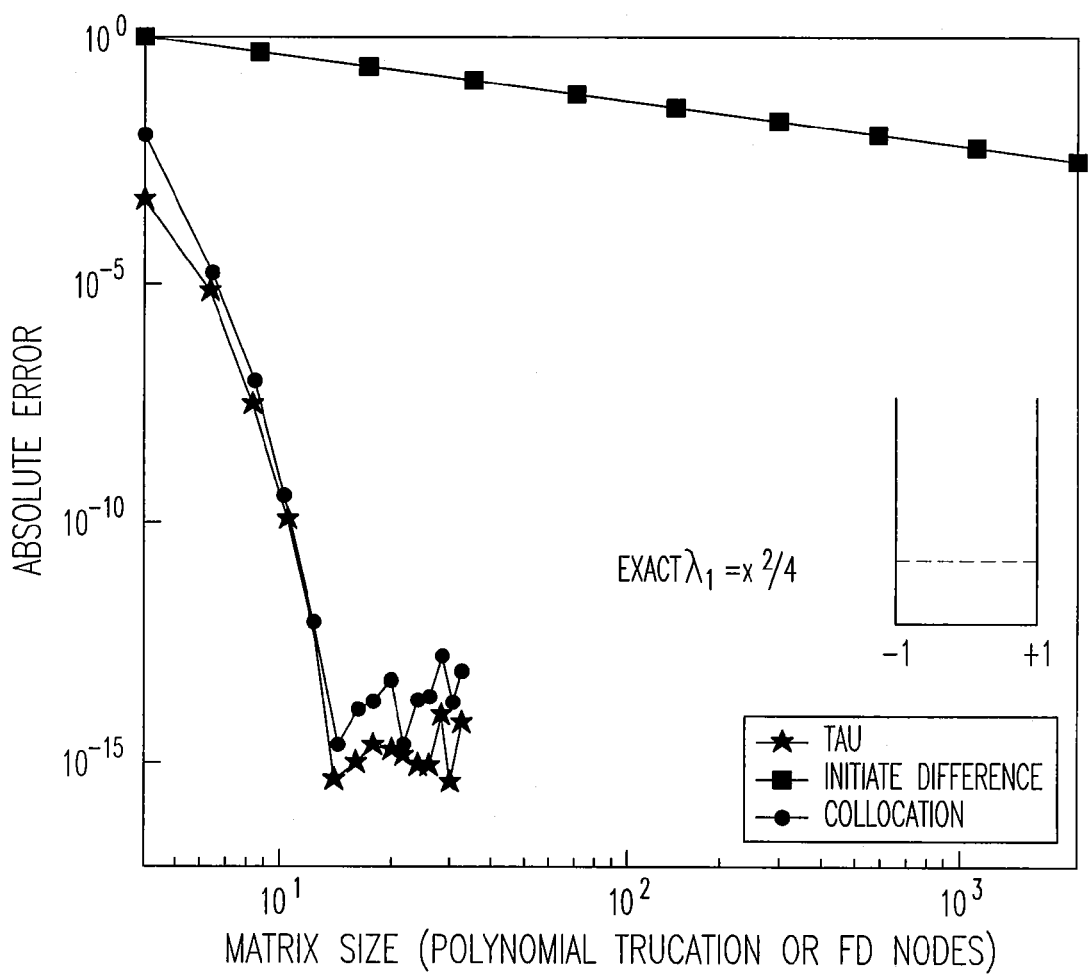
FIG. 2 shows convergence comparison of the tau collocation and finite difference methods for the ground state of the infinite potential well of width L=2 (unit-less).

FIG. 2 shows convergence comparison of the tau collocation and finite difference methods for the ground state of the infinite potential well of width L=2 (unit-less). To demonstrate the convergence, the absolute error versus polynomial truncation for an infinite potential well on the unit interval is shown. The convergence of the tau, collocation, and finite difference schemes for the ground state makes the advantage of spectral methods immediately apparent. The error for tau and collocation appears to drop by roughly an order of magnitude for each extra term added to the series and demonstrates the expected exponential convergence. The finite difference method, however, exhibits algebraic convergence; to decrease the error by a factor of two, the size of the finite difference matrix is doubled. While in semiconductor devices many parameters are only known to a few digits of precision, the computational savings demonstrated by spectral methods over finite difference schemes is overwhelming. To obtain an error of order $10^{-3}$, a 2048×2048 matrix is required if using finite difference. Accuracy an order of magnitude better is achieved with the tau method using a matrix that is only 5×5.

Consider the case of multiple elements. While the spectral method produces optimal results approximating smooth functions, in most practical heterostructures, the potential is only smooth within a given epitaxial layer with potential discontinuities in the band edge corresponding to material interfaces. Chebyshev polynomials will converge to a discontinuous function in the $L_2$ sense but not in the $L_\infty$ due to the Gibbs phenomenon., Although there exist methods for filtering out Gibbs phenomena and restoring spectral convergence, heterostructure problems are most efficiently solved using spectral elements since the discontinuities have known fixed locations. When there are multiple elements, there may be a different discretized Hamiltonian operator for each element.

A global solution may be obtained by requiring that each local solution and its derivative equal next local solution at the interface between elements. Consider a discontinuous potential well $$q(x) = \begin{cases} q_1: & -1 \leq x < 0 \\ q_2: & 0 \leq x \leq 1 \\ \infty: & |x| > 1 \end{cases} \quad (19)$$

letting for example $q_1=0$ and $q_2=100$. This gives two DEs where the solutions are coupled through boundary conditions at $x=0$.

$$\left\{-\frac{d^2}{dx^2} + q_{1,2}\right\} u_{1,2}(x) = \lambda u_{1,2}(x) \quad (20)$$
$$u_1(-1) = 0 \quad u_2(+1) = 0$$
$$u_1(0) = u_2(0) \quad u_1'(0) = u_2'(0)$$

Since both elements have unit length, the scaling factor is $\alpha=2$. Writing (20) in terms of (18)

$$L_{1,2} \hat{u}_{1,2} = \lambda B^2 \hat{u}_{1,2}$$
$$\delta_- \hat{u}_1 = 0, \delta_{30} \hat{u}_2 = 0$$
$$\delta_+ \hat{u}_1 - \delta_- \hat{u}_2 = 0$$
$$\alpha v_+ \hat{u}_1 - \alpha v_- \hat{u}_2 = 0 \quad (21)$$

The Dirichlet and Neumann operators are row vectors defined in (A4). Typically the elements will not be of the same length and the effective mass in the two regions may be different, so the Neumann operators must be scaled accordingly. Now the equations in (21) can be written as a GEP.

$$\begin{pmatrix} \delta_- & 0 \\ \delta_+ & -\delta_- \\ L_1 & 0 \\ \hline 0 & \delta_+ \\ -v_+ & v_- \\ 0 & L_2 \end{pmatrix} \begin{pmatrix} \hat{u}_1 \\ \hat{u}_2 \end{pmatrix} = \lambda \begin{pmatrix} B_{[2]}^2 & 0 \\ \hline 0 & B_{[2]}^2 \end{pmatrix} \begin{pmatrix} \hat{u}_1 \\ \hat{u}_2 \end{pmatrix} \quad (22)$$

Figure 3:
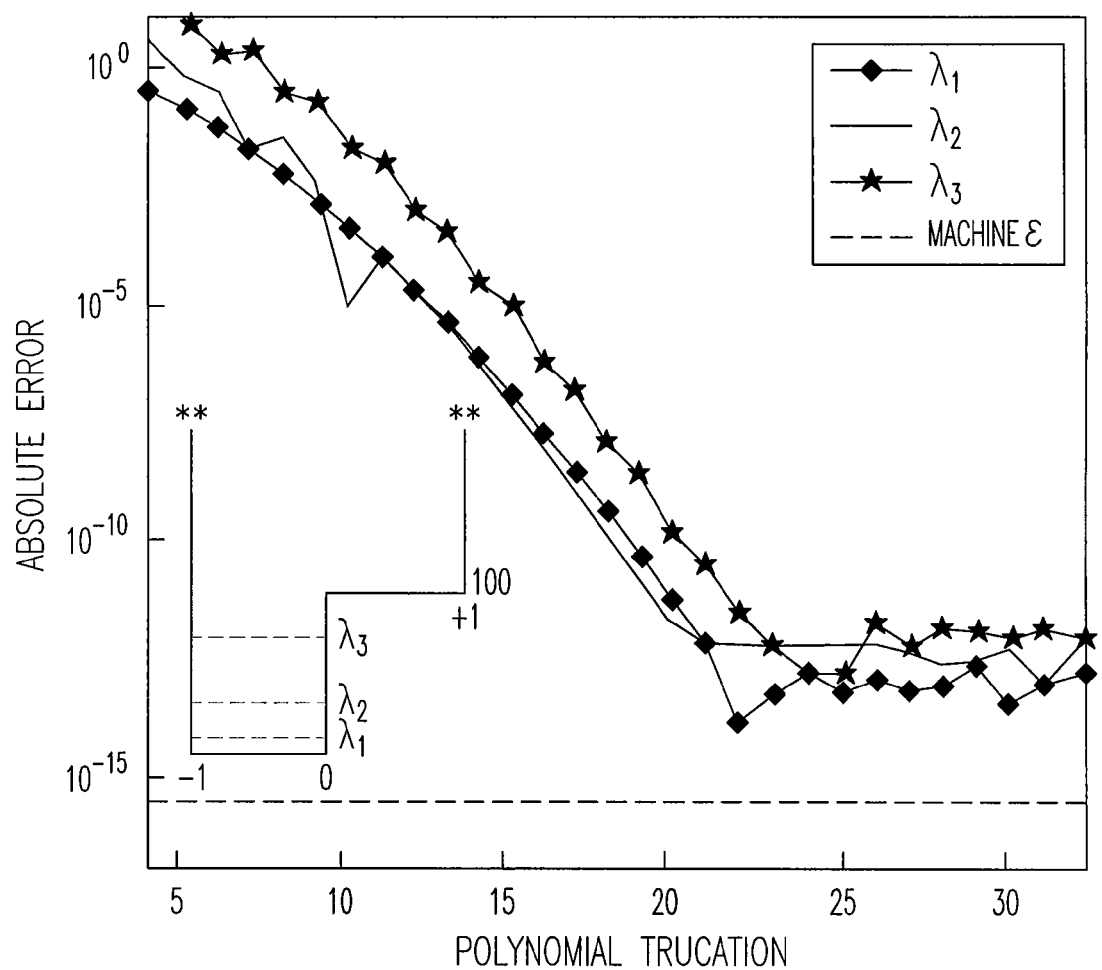
FIG. 3 shows absolute error for the first three eigenvalues for the two-element potential well.

This approach generalizes to any number of elements where matching conditions on the solution and its derivative are imposed at the interfaces. In general, the left matrix of the pencil (22) will be block tridiagonal and the right matrix will be block diagonal. FIG. 3 shows absolute error for the first three eigenvalues for the two-element potential well. FIG. 3 compares the first three eigenvalues of (22) with those obtained using the secant method. It should also be mentioned that although the same polynomial truncation is chosen for each element above, this is by no means necessary. Typically, one may use a larger truncation with longer elements or in elements where the wavefunction is expected to oscillate rapidly over space.

Unbounded domains may be considered in various embodiments. A radiation condition is constructed by imposing a Dirichlet-to-Neumann condition which depends on the group velocity. The Schrödinger equation is parabolic because it is first order in time and second order in space, therefore the group velocity has a square root dependence on the electron's energy. The square root function has a branch point at zero kinetic energy; therefore, it does not have a convergent Taylor series at this point. One approach to construct radiation conditions for the TISE is to approximate the group velocity by a linear least-squares fit. While this simplifies the problem greatly, the computed eigenvalues may be off by as much as 20%. Other authors have used Pade approximations of the group velocity with slightly improved results. In the special case of the potential which has the same asymptotic value on both sides, one can write exact radiation conditions by taking the wavenumber as a linear eigenvalue and the energy as a quadratic eigenvalue term. The quadratic eigenvalue problem leads to a doubling of matrix size and is rather limited in usefulness due to the requirement of asymptotic symmetry. Approximate absorbing boundary conditions are developed in detail in below. In an embodiment, instead of trying to approximate the radiation condition, a method may be used to compute the entire solution over all space to machine precision.

First, consider bound states where the outgoing waves are simple decaying exponentials. A common approach would be to simply truncate the domain at a large distance from the well with the expectation that the wavefunction will have decayed to approximately zero by reaching the endpoint. However, this approach is not optimal as the nodes will be over-clustered where the solution goes to zero. A much more efficient approach is to use a polynomial expansion on the semi-infinite interval. This has been accomplished with great success using Laguerre functions and it is possible to use multiple families of polynomials in the construction of multi-element operators such as in (22). However, the Laguerre functions are not polynomials and consequently the matrix representations of operators are full matrices and are more computationally expensive to construct. To compute solutions on finite-length intervals with Chebyshev polynomials and use Laguerre functions for semi-infinite intervals would require two sets of operators to solve the complete problem. An attractive alternative is to employ rational mapping, which allows one to map the semi-infinite interval to the unit interval while using the same Chebyshev approach as before. Such a mapping results in a clustering of nodes at the interface to the local solution and gives spectral convergence to solutions which decay exponentially.

The following discusses absorbing boundary conditions. A traditional way to solve DE's on unbounded domains is to truncate the domain and match the numerically computed local solution to a known asymptotic solution. For the TISE in one dimension, this is accomplished by imposing continuity of the logarithmic derivative of the wavefunction across the interface between the local and asymptotic regions. Since the asymptotic solution is of the form $\exp(\sqrt{\lambda-q}x)$, the logarithmic derivative at the interface is some constant times $\sqrt{\lambda-q}$. This term is simply a scaled group velocity. Since the overall eigenproblem depends on both $\lambda$ and $\sqrt{\lambda}$, in general, it can not be solved exactly. If, however, the eigenproblem contains only powers of $\lambda$ then it can be solved as a GEP by constructing the companion matrices.

In an embodiment, the approach of Shibata (See T. Shibeta, Phys. Rev B 43 (8) 6760-6763 (1991)) may be extended by approximating the scaled square-root function $\sqrt{1-\phi}$ for $\phi \in [0, 1]$ by a least-squares rational function.

$$\sqrt{1-\phi} \approx R(\phi) \equiv \frac{\sum_{k=0}^{K} \alpha_k \phi^k}{1 + \sum_{k=1}^{K} b_k \phi^k} = \frac{A(\phi)}{B(\phi)} \quad (23)$$

The expansion coefficients can be computed exactly by solving the system of equations $$\nabla_{\vec{a},\vec{b}} \int_0^1 \left( A(\phi) - \sqrt{1-\phi} \, B(\phi) \right)^2 d\phi = \vec{0} \quad (24)$$

Figure 4:
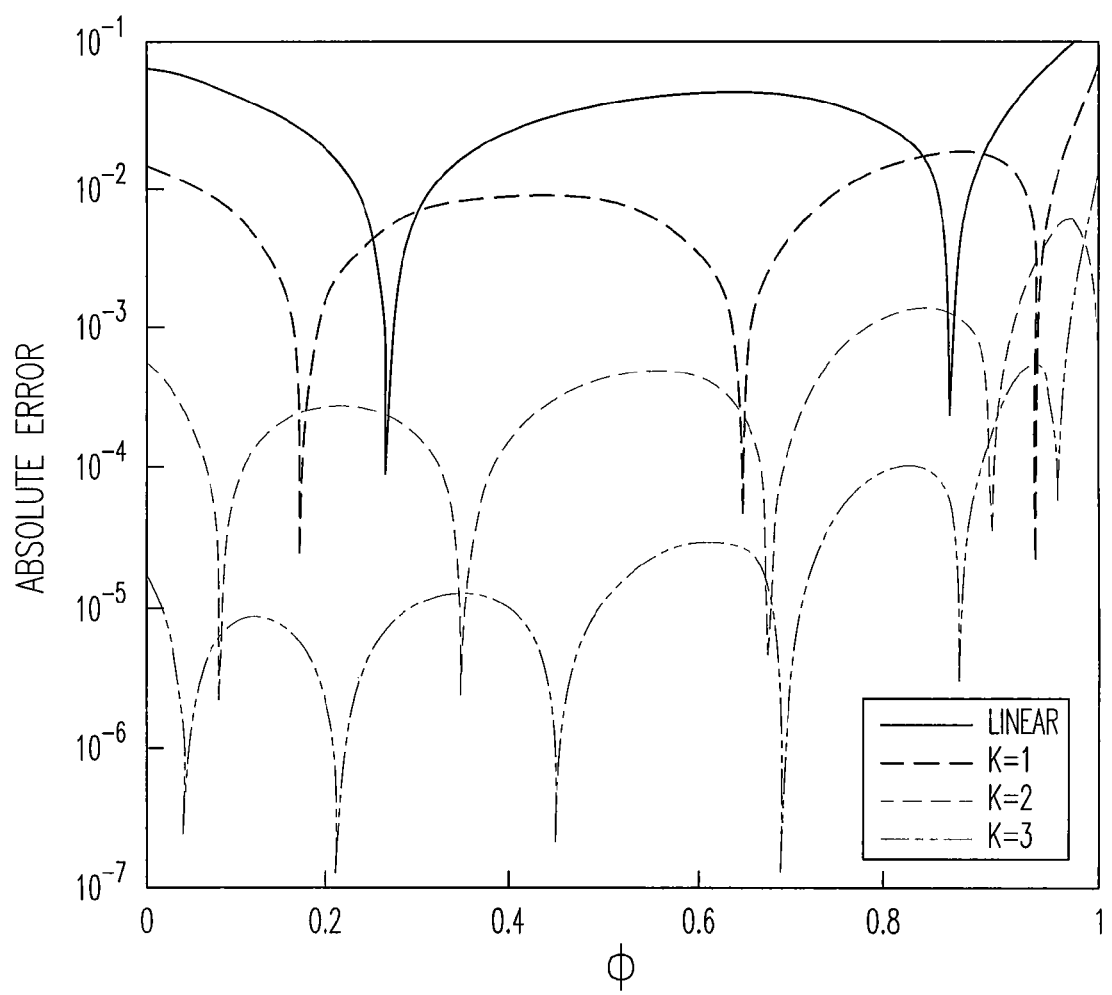
FIG. 4 shows absolute error for the linear, bi-linear, bi-quadratic, and bi-cubic least-squares approximations to $\sqrt{1-\phi}$.

These optimal coefficients are given in Table I. Using these various expansions, the error $|R(\phi)-\sqrt{1-\phi}|$ is plotted in FIG. 4. FIG. 4 shows absolute error for the linear, bi-linear, bi-quadratic, and bi-cubic least-squares approximations to $\sqrt{1-\phi}$. As one might expect the error decreases through most of the interval for higher order expansions, however, the error does not improve significantly in the neighborhood of the branch point at $\phi=1$. Although the error appears to be reasonably small, the DE is weakly ill-posed with respect to these approximate BCs. To demonstrate, the seven bound states of a finite potential well on the unit interval with scaled depth of 100 were computed. The minimum and maximum relative error for the computed eigenvalues is given in Table II. Whether one might desire to use these absorbing boundary conditions depends largely on the required accuracy and nature of the problem. This approach is reasonably suited for finding approximant eigenvalues far away from the top of the quantum well since the rational approximate fits the exact function more closely there. The problems with absorbing boundary conditions can be avoided entirely by solving the TISE over all space. This technique is introduced in the next section.

TABLE I

The coefficients of the first three least-squares rational approximations to the square root function.

|       | bi-linear          | bi-quadratic       | bi-cubic           |
|-------|--------------------|--------------------|--------------------|
| $\alpha_0$ | 0.98674351585014 | 0.99953973549047 | 0.99998457979265 |
| $\alpha_1$ | -0.91988472622478 | -1.67601451666117 | -2.38532812936857 |
| $\alpha_2$ | ... | 0.68013245842345 | 1.82014806012346 |
| $\alpha_3$ | ... | ... | -0.43463829207320 |
| $b_1$ | -0.52449567723343 | -1.18441536224446 | -1.88583012408147 |
| $b_2$ | ... | 0.24557351809084 | 1.00597708415993 |
| $b_3$ | ... | ... | -0.11510707954682 |

TABLE II

Minimum and maximum relative error of the seven bound state eigenvalues for least-squares rational approximations.

|           | bi-linear | bi-quadratic | bi-cubic |
|-----------|-----------|--------------|----------|
| min error | 1.2323%   | 0.7585%      | 0.3647%  |
| max error | 16.1008%  | 11.4503%     | 14.7714% |

The following discusses rational mapping for bound states. Consider an approach which maps the semi-infinite intervals $(-\infty,-R]$ and $[+R,\infty)$ to the unit interval. This is accomplished using a rational map. Let $y_-:[-\infty,-R]\mapsto[-1,1]$ and $y_+:[+R,+\infty]\mapsto[-1,1]$. These maps and their inverses are $$y_\pm = \pm 2\left(\frac{x \mp R}{x \pm R}\right) \mp 1, \quad x = R\frac{y_\pm \pm 3}{1 \mp y_\pm} \quad (25)$$

The mapped derivatives are $$\frac{\partial}{\partial x} = \frac{1}{4R}(y_\pm \mp 1)^2 \frac{\partial}{\partial y_\pm} \quad (26)$$

$$\frac{d^2}{dx^2} = \frac{1}{8R^2}(y_\pm \mp 1)^3 \frac{d}{dy_\pm} + \frac{1}{16R^2}(y_\pm \mp 1)^4 \frac{d^2}{dy_\pm^2} \quad (27)$$

Figure 5:
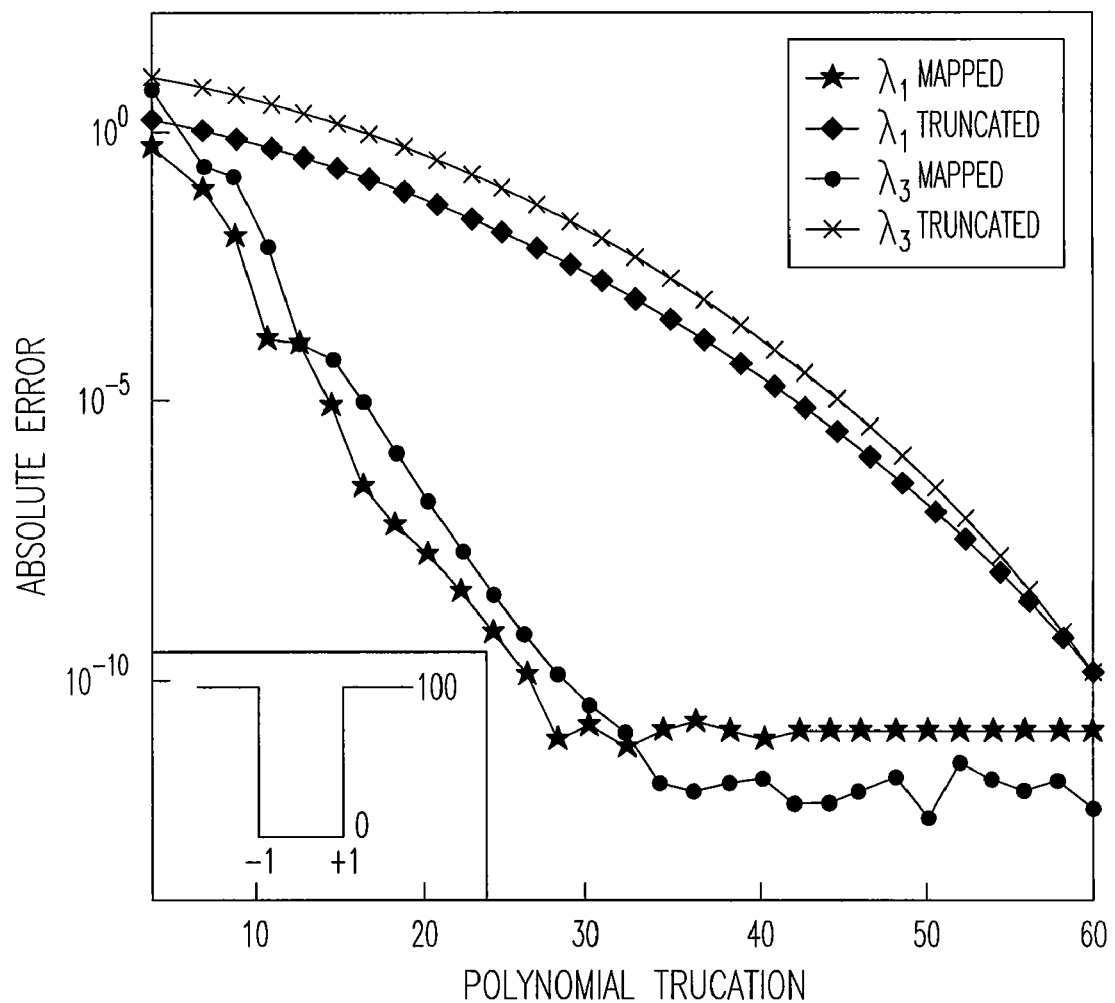
FIG. 5 shows absolute error of the first and third eigenvalues with rational mapping compared to domain truncation.

One can then construct a three-element scheme similar to (22) where there will be one sub-matrix each for the right and left asymptotic regions and a sub-matrix for the quantum well element. The matching of the Dirichlet conditions and Neumann conditions are exactly as before because the mappings are precisely linear at the points $x=\pm R$. This approach may be implemented and the convergence of the first and third eigenvalues of a finite potential well with depth $q_0=100$ and width $L=2$ examined. The integrator preconditioned operators for the left (−) and right (+) asymptotic regions are $$L_\pm = -\frac{1}{16R^2}(X \mp I)^4 + \frac{3}{8R^2}B(X \mp I)^3 + B^2\left[q_0 I - \frac{3}{8R^2}(X \mp I)^2\right] \quad (28)$$

whereas the operator for the quantum well is simply −I. The left-hand sided of the resulting matrix pencil is $$l.h.s. = \begin{pmatrix} \delta_- & & \\ \delta_+ & -\delta_- & \\ L_- & & \\ \hline v_+ & -v_- & \\ & -v_+ & v_- \\ & -I & \\ \hline & -\delta_+ & \delta_- \\ & & \delta_+ \\ & & L_+ \end{pmatrix} \quad (29)$$

and the right-hand-side is simply block diagonal with three $B_{[2]}^2$ blocks. The exact eigenvalues may be computed using the Newton-Raphson method. Additionally, $\lambda_{1,3}$ using domain truncation, where an element of length $L=15$ may be placed on either side of the quantum well, may be computed. FIG. 5 shows absolute error of the first and third eigenvalues with rational mapping compared to domain truncation. FIG. 5 demonstrates that both methods converge, however the rational map gives spectral convergence, whereas the truncated domain approach provides algebraic convergence. Both methods are limited to the calculation of bound states as the Dirichlet conditions imposed by domain truncation will discretize the continuous spectrum into real bound states and destroying the resonances. The rational mapping does not work for unbound states since it will map a function which oscillates periodically on an infinite interval to a finite interval, thereby creating a function which has an essential singularity at a point in the domain such as sin (1/x) and can not be approximated using spectral methods. For unbound states, a different approach may be taken.

The following discusses computing resonances with complex coordinate deformations. The resonances in the continuum density-of-states (DOS) correspond to the poles of the single-particle Green's function which lie off of the real axis. These eigenvalues do not correspond to physical states as their eigenfunctions exhibit unbounded growth at infinity. Nevertheless, numerous calculations for transitions between bound states and the continuous spectrum depend on the spectral density of unbound states. One can always obtain the DOS from the trace of the Green's function, if it is available.

$$p_{1D}(\lambda) = \sum_n \delta(\lambda - \lambda_n) = -\frac{1}{x}\Im[\text{Tr}\{G(x, x'; \lambda)\}] \quad (30)$$

For one-dimensional problems a "closed form" for the Green's function can be obtained from solving the boundary value problem using the shooting method. However, even constructing just the diagonal elements of the Green's function is unnecessarily expensive as only knowledge of the location of the poles is needed.

If the coordinate x is taken along the real axis, the eigenfunctions diverge at large distances. Since the coordinates are not a quantum mechanical observable, the spectrum is not affected by solving the eigenvalue problem along a different contour in the complex plane. In general, computation along a contour in the complex plane requires analytically continuing the potential in the complex. However, in the asymptotic region where the potential is constant, this continuation is trivially accomplished. By choosing a new coordinate contour of the form $$z = \begin{cases} x - ic(-x - R)^n & \text{if } x < -R \\ x & \text{if } -R < x < +R \\ x + ic(x - R)^n & \text{if } x > +R \end{cases} \quad (31)$$

$$c \in R^+, \ n \in \{2, 3, 4, \ldots\}$$

the resonant eigenfunctions will exhibit super-exponential decay along the contour. Since the contour is at least $C^1$, there will be no reflection. $C^1$ is the space of all continuously differentiable functions. Consequently, only the resonant eigenvalues with negative imaginary part will be resolved since they correspond to outward propagating solutions. To compute the eigenfunctions along the new contour, the modification of the Hamiltonian to the new coordinates is performed.

$$\frac{d^2}{dz^2} = -\frac{d^2z}{dx^2}\left(\frac{dz}{dx}\right)^{-3}\frac{d}{dx} + \left(\frac{dz}{dx}\right)^{-2}\frac{d^2}{dx^2} \quad (32)$$

Convergence depends on the choice of the parameters n and c. For low energy resonances, n=2 and c=1 give optimal convergence, however, for higher energy states, the solution does not decay fast enough to resolve the eigenfunctions. In these cases, using a cubic or quartic deformation (n=3,4) or larger coefficient c will make it possible to resolve higher energy states at the expense of requiring higher truncation for the lower states.

Figure 6:
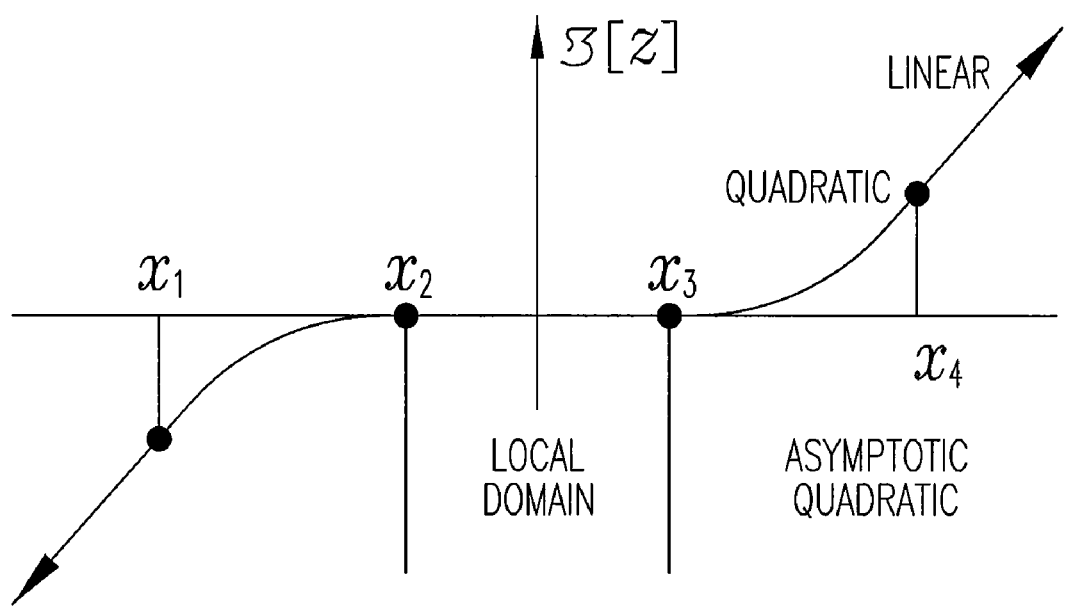
FIG. 6 shows a $C^1$ contour along which the solutions have asymptotic exponential decay.

The convergence for bound states was shown (FIG. 5) to improve greatly by mapping the semi-infinite interval onto the finite interval, so the same approach may be applied here. The rational map gives the best convergence for functions which decay exponentially, however, with a quadratic deformation of the coordinates is used, the resonant eigenfunctions will decay as $e^{-x^2}$. For this type of decay the rational mapping will over-resolve the eigenfunctions away from the local solution. An asymptotically linear deformation will give exponential decay and therefore faster convergence, but will not be globally $C^1$ unless a matching curve is introduced, such as in the contour in FIG. 6, requiring the introduction of intermediate, "matching" elements. FIG. 6 shows a $C^1$ contour along which the solutions have asymptotic exponential decay.

The following discusses scattering states and tunneling. Scattering states belong to the continuous spectrum. For a one-dimensional problem, they can be thought of as right or left propagating waves. Unlike resonances, scattering states are physical solutions, but are not true eigenfunctions since they do not satisfy two-point boundary conditions. Traditionally, the scattering states and tunneling probability have been computed using shooting by approximating the potential as piecewise constant or linear. Here the same approach may be used, except that the spectral method is optimal because, instead of approximating the potential as piecewise constant or linear, any piecewise smooth function may be allowed.

The following describes how to compute the right-propagating scattering wavefunction for a single element. Generalization to multiple elements is similar to the eigenvalue problems before and can be solved rapidly since it is a block-tridiagonal system. The initial values for the problem are imposed at the right endpoint. Using the scaled functions and parameters as before $$u(+1)=1, u'(+1)=ik_r, k_{r,1}=\sqrt{\lambda - q_{r,1}} \quad (33)$$

To compute the Chebyshev expansion coefficients for the solution, one must solve the integration-preconditioned system $$\begin{pmatrix} \delta_+ \\ v_+ \\ -I + B^2[V - \lambda I] \end{pmatrix} \hat{u} = \begin{pmatrix} 1 \\ ik_r \\ 0 \end{pmatrix} \quad (34)$$

The approach is similar for left propagating solutions, except initial values are imposed at the left endpoint and $ik_r$ is replaced by $-ik_l$. Once the solution vector, $\hat{u}$ is computed, the reflection and tunneling probabilities are calculated by $$R(\lambda) = \left|\frac{(ik_l\delta_- - v_-)\hat{u}}{(ik_l\delta_- + v_-)\hat{u}}\right|^2, \quad T(\lambda) = 1 - R(\lambda) \quad (35)$$

The following discusses numerical inner products. Frequently in quantum mechanics, one is interested in computing inner products such as a transition probability or the expectation value of an operator. In an embodiment, by applying the spectral-tau method to compute the expansion coefficients for the eigenfunctions of the Hamiltonian, inner products can be computed rapidly with quadrature accuracy without requiring a transformation to point space. Consider computing the inner product $$(u|v) = \int_{-1}^{+1} u^*(x)v(x)dx \quad (36)$$

The numerical integration is carried out as $$(u|v) = b\hat{U}^{\dagger}\hat{v} \quad (37)$$

Here the notation $\hat{U}^{\dagger}$ does not mean the Hermitian conjugate of the matrix $\hat{U}$, but rather that the matrix is constructed using the complex conjugates of the elements of $\hat{u}$. The definite integral operator b is $$b = -2(-1 0 3^{-1} 0 1 5^{-1} 0 \ldots (N^2-1)^{-1}) \quad (38)$$

Constructing the convolution matrix is the most numerically expensive aspect since it scales as $O(N^3)$. This can be improved greatly by plugging the definition into the inner product.

$$(u|v) = b\sum_{k=0}^{N}\hat{u}_k^* T_k \hat{v} = \sum_{k=0}^{N}\hat{u}_k^* bT_k \hat{v} \quad (39)$$

On can then define an inner product operator matrix where the rows are the integrated convolution matrices of the basis functions $$K = \begin{pmatrix} bT_0 \\ bT_1 \\ \vdots \\ bT_N \end{pmatrix} \quad (40)$$

The benefit to constructing the matrix K is that it may be computed to an arbitrarily large truncation, independent of a given problem. This matrix can be stored in a file and one need only take the upper left $(N+1)\times(N+1)$ sub-matrix to compute the inner product. One then has $$(u|v) = \hat{u}^* K \hat{v} \quad (41)$$

Where u* is the Hermitian conjugate. One is also frequently interested in computing a number of transition probabilities or expectation values of operators. Given a linear operator Ô which is discretized as O, it is possible to compute transition probabilities between a number of states $u_j$ where $j=1 \ldots n$ simultaneously. Let S be a an $(N+1)\times n$ matrix containing a subset of the eigenvectors of the discretized Hamiltonian H such that $$S = (\hat{u}_1 \hat{u}_2 \hat{u}_3 \ldots \hat{u}_n) \quad (42)$$

Then the complete transition matrix for the operator £ is $$\begin{pmatrix} (u_1|\hat{O}u_1) & (u_1|\hat{O}u_2) & \cdots & (u_1|\hat{O}u_n) \\ (u_2|\hat{O}u_1) & (u_2|\hat{O}u_2) & & (u_2|\hat{O}u_n) \\ \vdots & & \ddots & \vdots \\ (u_n|\hat{O}u_1) & (u_n|\hat{O}u_2) & \cdots & (u_n|\hat{O}u_n) \end{pmatrix} = S * KOS \quad (43)$$

Figure 7:
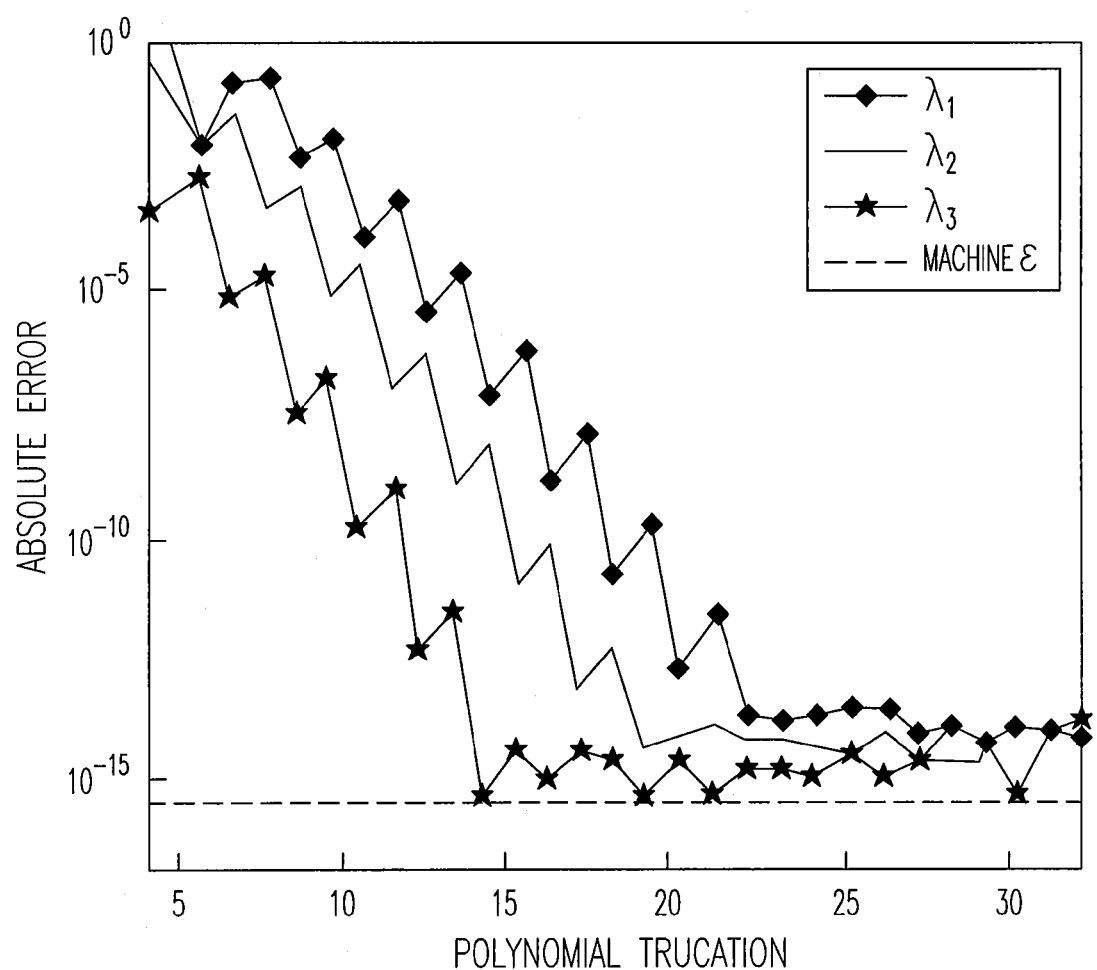
FIG. 7 shows convergence of the transition matrix elements of the scaled momentum operator.

The matrix KO can be prepared in advance, since it does not depend on the potential. With this advantage, the matrix multiplication in the spectral domain is as fast as the analogous computation in point space. FIG. 7 shows convergence of the transition matrix elements of the scaled momentum operator. One benefit of working in the spectral domain is that it is easy to determine if a solution is fully resolved by observing the exponential decay of expansion coefficients. This is less apparent by examining the solution's behavior in point space.

In an embodiment, a spectral element method provides a fast and efficient method of solving the TISE for an arbitrary semiconductor heterostructure. By expanding in terms of orthogonal polynomials, a matrix representation of the Hamiltonian may be obtained from which as many eigenfunctions and eigenvalues as desired may simultaneously be computed. This offers a substantial advantage over more prevalent shooting methods, as one does not need to hunt for eigenvalues, because that work is performed by a matrix eigensolver routine. In various embodiments, the MATLAB® function eig may be used to obtain eigenvalues and eigenvectors, though these embodiments are limited to using MATLAB®. Embodiments of the spectral method may require much smaller matrices than the finite difference method to achieve comparable error. Frequently, the spectral matrix size may be orders of magnitude smaller. Integration preconditioning may be introduced to the Schrödinger eigenproblem, giving a sparse quasi-banded structure to the matrices.

The spectral element method may be extended to incorporate unbounded domains through rational mapping. The mapping may provide superior convergence over the more traditional domain truncation approach. In various embodiments, using a complex coordinate deformation for the end elements, the TISE may be solved on a new contour, along which its eigenfunctions have a convergent expansion. Additionally, the scattering states and tunneling probability may be straight-forwardly obtainable by formulating a spectral element initial value problem. Various embodiments include a straight-forward computation of inner products and expectations of operators in the spectral domain using simple matrix vector multiplication.

APPENDIX A: CHEBYSHEV MATRICES AND MATLAB® SCRIPTS

The fast cosine transform from nodal to spectral values is temp=*ifft*([u(1:N);u(N-1:-1:2)]);

uhat=[temp(1,:);2*temp(2:N,:)];

and the transform from spectral to nodal values is temp=fft([uhat(1,:); ...

[uhat(2:N,:);uhat(N-1:-1:2,:)]/2];

u=temp(1:N,:);}

The Chebyshev differentiation matrix, D, for N=8 is $$D = \begin{pmatrix} 0 & 1 & 0 & 3 & 0 & 5 & 0 & 7 & 0 \\ 0 & 0 & 4 & 0 & 8 & 0 & 12 & 0 & 16 \\ 0 & 0 & 0 & 6 & 0 & 10 & 0 & 14 & 0 \\ 0 & 0 & 0 & 0 & 8 & 0 & 12 & 0 & 16 \\ 0 & 0 & 0 & 0 & 0 & 10 & 0 & 14 & 0 \\ 0 & 0 & 0 & 0 & 0 & 0 & 12 & 0 & 16 \\ 0 & 0 & 0 & 0 & 0 & 0 & 0 & 14 & 0 \\ 0 & 0 & 0 & 0 & 0 & 0 & 0 & 0 & 16 \\ 0 & 0 & 0 & 0 & 0 & 0 & 0 & 0 & 0 \end{pmatrix} \quad (A1)$$

This can be constructed easily with the script $D$=zeros($N$+1);

for $k$=1:$ND(k,k+1:2:N+1)=2*(k:2:N)$end $D(1,:)=D(1,:)/2$;

The Chebyshev position operator matrix is $$X = \frac{1}{2} \begin{pmatrix} 0 & 1 & 0 & & & \\ 2 & 0 & 1 & 0 & & \\ 0 & 1 & 0 & 1 & 0 & \\ & 0 & 1 & 0 & 1 & 0 \\ & & & \ddots & & \ddots \end{pmatrix} \quad (A2)$$

The X matrix has the script band=ones($N$,1)/2;

$X$=diag(band,−1)+diag(band,1);

$X(2,1)1=1$;

The Chebyshev integration matrix, B, which is the pseudo-inverse of D has the form $$B_{[1]} = \begin{bmatrix} 0 & 0 & 0 & 0 & 0 & \cdots & 0 \\ 1 & 0 & -\frac{1}{2} & 0 & 0 & \cdots & 0 \\ 0 & \frac{1}{4} & 0 & -\frac{1}{4} & 0 & \cdots & 0 \\ \vdots & & \ddots & \ddots & \ddots & & \vdots \\ \vdots & & & \frac{1}{2k} & 0 & -\frac{1}{2k} & \\ \vdots & & & & \ddots & \ddots & \vdots \\ 0 & & \cdots & & & \frac{1}{2N} & 0 \end{bmatrix} \quad (A3)$$

The script for the B matrix is band=[01./(2*(1:$N$+1))];

$B$=diag(band(2:$N$+1),−1)−diag(band(1:$N$),1);

$B(2,1)=1$;

The Dirichlet and Neumann operators are $$\delta_- = (1 \; -1 \; 1 \; -1 \; 1 \; -1 \; 1 \; -1 \; \cdots) \quad (A4)$$
$$\delta_+ = (1 \; 1 \; 1 \; 1 \; 1 \; 1 \; 1 \; 1 \; \cdots)$$
$$v_- = (0 \; 1 \; -4 \; 9 \; -16 \; 25 \; -36 \; 49 \; \cdots)$$
$$v_+ = (0 \; 1 \; 4 \; 9 \; 16 \; 25 \; 36 \; 49 \; \cdots)$$

The use of MATLAB® herein is by way of example only. Numerical routines may be developed using other software packages, including, but not limited to Fortran, C++, Pascal, ARPACK, or the like.

The spectral element method is mathematically more efficient and allows more rapid convergence to solutions than existing techniques, and allows simultaneous solution for all eigenvalues and eigenfunctions of the governing equation. Mapping techniques may be used to overcome the domain truncation and boundary condition steps of existing techniques. In various embodiments, a solver may greatly reduce the time and cost for designing structures for wave mechanics applications. A solver may be realized with semiconductor memory for storing values and a processor for calculating values.

Frequently in applications, when a partial differential equation (PDE) is discretized using any method, it leads to a large matrix. In general, determining all of the eigenvalues and eigenvectors of such a matrix is computationally expensive and frequently unnecessary for two reasons. First, only a fraction of the eigenvectors of the matrix approximate eigenfunctions of the continuous problem. For even the best spectral discretizations, this fraction is approximately one third. The second reason is that from the subset of eigenvectors which are physically meaningful, often only a portion of these are useful in understanding aspects of the physical system such as modes of oscillation or stability properties.

In an embodiment, a method to provide fast and highly accurate approach to problems of this kind includes defining a problem in terms of a partial differential equation, where the problem is defined on a physical grid using spectral elements. If the continuous operator can be transformed to be self-adjoint or have parity properties, such as having symmetric or antisymmetric eigenfunctions, then this transformation is performed. If the problem is nonsymmetrizeable, then finite-differences may be implemented on the same (unstructured) grid used by the spectral element methods. In this case all interpolation steps are eliminated from the procedure. The coefficients of the PDE are interpolated onto a uniform grid which covers the same domain as the spectral element grid using nearest-neighbor interpolation. On the uniform grid, the operator is discretized using low order centered differences and sparse banded matrices. Any discontinuities in the coefficient functions will not severely affect the convergence of low order methods as they will with spectral methods. After selecting a portion of the spectrum of interest, the corresponding eigenfunctions may be computed using a Lanczos method. If the matrix is not symmetric, then both the left and right eigenvectors are computed using the Arnoldi method. The eigenvectors may then be linearly interpolated back onto the original spectral grid. These eigenvectors and associated eigenvalues may be considered to be crudely computed eigenvectors and eigenvalues. The operator is discretized using a high order scheme which possesses the same symmetry properties as the finite difference scheme (e.g. Discontinuous Galerkin methods). The crudely computed eigenvectors and eigenvalues may then be used as the starting point for a Rayleigh quotient iteration, or Generalized Rayleigh quotient iteration in the nonsymmetric case. If the estimates provided by the crudely computed eigenvectors and eigenvalues are good enough for the Rayleigh quotient iteration to converge, then it may typically resolve the truncated problem to machine precision within three iterations.

From numerical experiments, this procedure may be significantly faster than simply using an approach such as the QR or QZ algorithms to determine the entire eigenspace. In some cases, the above approach may be more that one hundred times faster than a full decomposition. As for why one might not want to use finite differences and avoid the spectral-element enhancement entirely, depends on the specific problem. Low order differences will converge very slowly, in particular, if the coefficients are discontinuous functions, the convergence will be linear. This means that every time the size of the matrix is doubled, the error will be halved. If the matrix is 1000×1000 and the error is 10%, then increasing the matrix size to 2000×2000 will reduce the error to 5%. As long as the discontinuities fall on the boundaries of the elements, the convergence for the spectral method will be exponential. It will most likely require less time to use the above refinement procedure to resolve the eigenproblem to machine precision than it would take to reduce the error by half in the finite difference example. Most importantly, various embodiments may be implemented using platform independent public domain algorithms which are being used in an entirely novel way.

Various embodiments using the described algorithm may have a variety of natural applications. These include, but are not limited, computing electronic states in semiconductor nanostructures such as quantum wells, wires, dots, lasers, and submicron transistors which will aid in the design of high-performance devices of particular interest for high-speed communications, imaging, and remote sensing. It is suitable for computing electromagnetic modes in cavities and waveguides including optical fibers and photonic integrated circuits. The method can also be used for stability analysis for the Navier-Stokes and Euler equations in complex domains. Various embodiments may have applications in the design of jet engines and airfoils to inhibit the formation of acoustic shockwaves. In general, the stability analysis of any initial-boundary value problem entails linearization about a stationary solution and then computing the spectrum of the linearized operator. For this broad category of problems, the spectral element algorithm is well suited.

In an embodiment, a computer-readable medium has computer-executable instructions for performing a method that comprises modeling a structure having an inhomogeneous media represented as an open medium or an unbounded medium in terms of spectral elements, applying a mapping and a deformation of a coordinate system to a contour in a complex plane, where the mapping and the deformation are applied to determine eigenvalues and eigenfunctions of the structure, and providing the eigenvalues and eigenfunctions to construct parameters for the structure. In an embodiment, applying a mapping and a deformation of a coordinate system to a contour in a complex plane includes applying a mapping and a deformation of a coordinate system to a contour in a complex plane to construct matched-layer elements. In an embodiment, the method includes applying a crude discretization to provide initial eigenvalues and eigenfunctions and applying a refining discretization to the initial eigenvalues and eigenfunctions to determine the eigenvalues and eigenfunctions. In an embodiment, determining eigenvalues and eigenfunctions includes determining eigenvalues and eigenfunctions of a wave equation. In an embodiment, the method includes deforming coordinates in a complex plane to a contour along which the eigenfunctions decay exponentially. In an embodiment, the method includes applying trial functions to differential equations, the trial functions expanded in terms of orthogonal polynomials. In an embodiment, the method includes using Chebyshev polynomials of the first kind for the trial functions. In an embodiment, providing the eigenvalues and eigenfunctions to construct parameters for the structure includes providing the eigenvalues and eigenfunctions to construct a semiconductor heterostructure device.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the full scope of equivalents to which such claims are entitled.

What is claimed is:

1. A computerized method comprising:
modeling a structure, the structure being finite and having an inhomogeneous media, the structure represented by a differential equation using a Laplacian operator and a prescribed potential, the modeling of the structure including representing the inhomogeneous media as an open domain or an unbounded domain in terms of a spectral element, the open domain or the unbounded domain having an interval of semi-infinite length or infinite length;
mapping the interval of semi-infinite length or infinite length to an interval of finite length;
applying a deformation of a coordinate system of the differential equation to complex coordinates along a contour in a complex plane such that eigenfunctions of the differential equation remain bounded;
determining an eigenvalue and an associated eigenfunction for the structure using the mapped interval and the deformed coordinate system;
storing the determined eigenvalue in a memory; and
providing a characteristic of the structure to an output, the characteristic related to the eigenvalue or the associated eigenfunction.

2. The computerized method of claim 1, wherein mapping and applying the deformation includes mapping and applying the deformation to construct matched-layer elements.

3. The computerized method of claim 1, wherein the method includes:
applying a low order discretization to provide an initial eigenvalue and associated eigenfunction; and
applying a refining discretization to the initial eigenvalue and associated eigenfunction to determine the eigenvalue and the associated eigenfunction.

4. The computerized method of claim 1, wherein the differential equation is a wave equation.

5. The computerized method of claim 1, wherein the method includes deforming coordinates in a complex plane to a contour along which the eigenfunctions decay exponentially.

6. The computerized method of claim 1, wherein the method includes applying trial functions to the differential equation, the trial functions expanded in terms of orthogonal polynomials.

7. The computerized method of claim 6, wherein the method includes using Chebyshev polynomials of the first kind for the trial functions.

8. The computerized method of claim 1, wherein the structure is a semiconductor heterostructure device.

9. The computerized method of claim 1, wherein the structure is a semiconductor nanostructure.

10. The computerized method of claim 1, wherein the structure is a submicron transistor.

11. The computerized method of claim 1, wherein the structure is a quantum well device.

12. The computerized method of claim 1, wherein the structure is an optical fiber.

13. The computerized method of claim 1, wherein the structure is a photonic integrated circuit.

14. A computer-readable storage medium having computer-executable instructions for performing a method comprising:

modeling a structure, the structure being finite and having an inhomogeneous media, the structure represented by a differential equation using a Laplacian operator and a prescribed potential, the modeling of the structure including representing the inhomogeneous media as an open domain or an unbounded domain in terms of a spectral element, the open domain or the unbounded domain having an interval of semi-infinite length or infinite length;

mapping the interval of semi-infinite length or infinite length to an interval of finite length;

applying a deformation of a coordinate system of the differential equation to complex coordinates along a contour in a complex plane such that eigenfunctions of the differential equation remain bounded;

determining an eigenvalue and an associated eigenfunction for the structure using the mapped interval and the deformed coordinate system;

storing the determined eigenvalue in a memory; and providing a characteristic of the structure to an output, the characteristic related to the eigenvalue or the associated eigenfunction.

15. The computer-readable storage medium of claim 14, wherein mapping and applying the deformation includes mapping and applying the deformation to construct matched-layer elements.

16. The computer-readable storage medium of claim 14, wherein the method includes:

applying a crude discretization to provide an initial eigenvalue and associated eigenfunction; and applying a refining discretization to the initial eigenvalue and associated eigenfunction to determine the eigenvalue and the associated eigenfunction.

17. The computer-readable storage medium of claim 14, wherein the differential equation is a wave equation.

18. The computer-readable storage medium of claim 14, wherein the method includes deforming coordinates in a complex plane to a contour along which the eigenfunctions decay exponentially.

19. The computer-readable storage medium of claim 14, wherein the method includes applying trial functions to the differential equation, the trial functions expanded in terms of orthogonal polynomials.

20. The computer-readable storage medium of claim 19, wherein the method includes using Chebyshev polynomials of the first kind for the trial functions.

21. The computer-readable storage medium of claim 14, wherein the structure is a semiconductor heterostructure device.

22. An apparatus comprising:

a processor; and memory having instructions executable by the processor for performing operations to:

model a structure, the structure being finite and having an inhomogeneous media, the structure represented by a differential equation using a Laplacian operator and a prescribed potential, the modeling of the structure including representing the inhomogeneous media as an open domain or an unbounded domain in terms of a spectral element, the open domain or the unbounded domain having an interval of semi-infinite length or infinite length;

map the interval of semi-infinite length or infinite length to an interval of finite length;

apply a deformation of a coordinate system of the differential equation to complex coordinates along a contour in a complex plane such that eigenfunctions of the differential equation remain bounded;

determine an eigenvalue and an associated eigenfunction for the structure using the mapped interval and the deformed coordinate system;

store the determined eigenvalue in a memory; and provide a characteristic of the structure to an output, the characteristic related to the eigenvalue or the associated eigenfunction.

23. The apparatus of claim 22, wherein the structure includes a semiconductor heterostructure device.

24. The apparatus of claim 22, wherein the structure includes a semiconductor nanostructure.

25. The apparatus of claim 22, wherein the structure includes a quantum well device.

26. The apparatus of claim 22, wherein the structure includes an optical fiber.

27. The apparatus of claim 22, wherein the structure includes a photo-detector.

* * * * *

UNITED STATES PATENT AND TRADEMARK OFFICE
CERTIFICATE OF CORRECTION

PATENT NO. : 7,617,081 B2 Page 1 of 1
APPLICATION NO. : 11/157474
DATED : November 10, 2009
INVENTOR(S) : Von Winckel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Nineteenth Day of October, 2010

David J. Kappos
*Director of the United States Patent and Trademark Office*